United States Patent
Chandra et al.

(10) Patent No.: US 7,433,364 B2
(45) Date of Patent: Oct. 7, 2008

(54) METHOD FOR OPTIMIZING QUEUING PERFORMANCE

(75) Inventors: Prashant R. Chandra, Sunnyvale, CA (US); Uday Naik, Fremont, CA (US); Alok Kumar, Santa Clara, CA (US); Ameya S. Varde, Santa Clara, CA (US); David A. Romano, Cumberland, RI (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 10/746,273

(22) Filed: Dec. 24, 2003

(65) Prior Publication Data

US 2005/0147038 A1    Jul. 7, 2005

(51) Int. Cl.
*H04L 12/54* (2006.01)
(52) U.S. Cl. ............... 370/429; 370/235; 370/412; 370/428
(58) Field of Classification Search ............ 370/235, 370/412, 429, 428
See application file for complete search history.

(56) References Cited

U.S. PATENT DOCUMENTS

| | | | | |
|---|---|---|---|---|
| 5,319,778 A | * | 6/1994 | Catino | 707/102 |
| 5,488,724 A | * | 1/1996 | Firoozmand | 709/212 |
| 5,519,701 A | * | 5/1996 | Colmant et al. | 370/412 |
| 5,617,537 A | * | 4/1997 | Yamada et al. | 709/214 |
| 5,687,316 A | * | 11/1997 | Graziano et al. | 709/250 |
| 5,708,779 A | * | 1/1998 | Graziano et al. | 709/250 |
| 5,751,951 A | * | 5/1998 | Osborne et al. | 709/250 |
| 5,781,799 A | * | 7/1998 | Leger et al. | 710/22 |
| 6,005,866 A | * | 12/1999 | Lincoln | 370/398 |
| 6,049,390 A | * | 4/2000 | Notredame et al. | 358/1.15 |
| 6,131,113 A | * | 10/2000 | Ellsworth et al. | 709/213 |
| 6,201,807 B1 | * | 3/2001 | Prasanna | 370/389 |
| 6,356,951 B1 | * | 3/2002 | Gentry, Jr. | 709/250 |
| 6,389,468 B1 | * | 5/2002 | Muller et al. | 709/226 |
| 6,434,170 B1 | * | 8/2002 | Movshovich et al. | 370/536 |
| 6,453,360 B1 | * | 9/2002 | Muller et al. | 709/250 |
| 6,480,489 B1 | * | 11/2002 | Muller et al. | 370/389 |
| 6,483,804 B1 | * | 11/2002 | Muller et al. | 370/230 |
| 6,650,640 B1 | * | 11/2003 | Muller et al. | 370/392 |
| 6,687,256 B2 | * | 2/2004 | Modali et al. | 370/412 |
| 6,717,576 B1 | * | 4/2004 | Duluk et al. | 345/419 |
| 6,717,910 B1 | * | 4/2004 | Kasper et al. | 370/229 |

(Continued)

OTHER PUBLICATIONS

Maged M. Michael and Michael L. Scott, "Simple, Fast and Practical Non-Blocking Concurrent Queue Algorithms", Proceedings of the 19th annual international symposium on Computer architecture, p. 224-235, May 23-26, 1996, Philadelphia, Pennsylvania, United States.*

(Continued)

Primary Examiner—Huy D. Vu
Assistant Examiner—Luat Phung
(74) Attorney, Agent, or Firm—Fish & Richardson P.C.

(57) ABSTRACT

Techniques for optimizing queuing performance include passing, from a ring having M slots, one or more enqueue requests and one or more dequeue requests to a queue manager, and determining whether the ring is full, and if the ring is full, sending only an enqueue request to the queue manager when one of the M slots is next available, otherwise, sending both an enqueue request and a dequeue request to the queue manager.

29 Claims, 3 Drawing Sheets

U.S. PATENT DOCUMENTS

| | | | |
|---|---|---|---|
| 6,757,756 B1 * | 6/2004 | Lanteigne et al. | 710/52 |
| 6,779,084 B2 * | 8/2004 | Wolrich et al. | 711/118 |
| 7,051,175 B2 * | 5/2006 | Vo | 711/163 |
| 7,149,212 B2 * | 12/2006 | Calvignac et al. | 370/360 |
| 7,269,179 B2 * | 9/2007 | Wolrich et al. | 370/412 |
| 2004/0100954 A1 * | 5/2004 | Dai et al. | 370/389 |
| 2004/0128401 A1 * | 7/2004 | Fallon et al. | 709/250 |
| 2004/0205166 A1 * | 10/2004 | DeMoney | 709/219 |
| 2004/0252687 A1 | 12/2004 | Lakshmanamurthy et al. | |
| 2005/0038793 A1 * | 2/2005 | Romano et al. | 707/100 |
| 2005/0050306 A1 | 3/2005 | Lakshmanamurthy et al. | |
| 2005/0108718 A1 | 5/2005 | Kumar et al. | |
| 2005/0120195 A1 | 6/2005 | Kumar | |
| 2005/0129046 A1 * | 6/2005 | Kumar et al. | 370/428 |
| 2005/0160139 A1 * | 7/2005 | Boucher et al. | 709/203 |
| 2006/0039374 A1 * | 2/2006 | Belz et al. | 370/389 |
| 2006/0064508 A1 * | 3/2006 | Panwar et al. | 709/250 |
| 2006/0143415 A1 | 6/2006 | Naik | |
| 2006/0221978 A1 * | 10/2006 | Venkatachalam | 370/395.41 |
| 2007/0201497 A1 * | 8/2007 | Krishnamurthy | 370/412 |

OTHER PUBLICATIONS

Adiletta, M., et al., "Packet over SONET: Achieving 10 Gigabit/sec Packet Processing with an IXP2800", *Intel Technology Journal*, 6(3):29-39, Aug. 15, 2002.

Adiletta, M., et al., "The Next Generation of Intel IXP Network Processors", *Intel Technology Journal*, 6(3):6-18, Aug. 15, 2002.

Brink, P., et al., "Network Processing Performance Metrics for the IA- and IXP-Based Systems", *Intel Technology Journal*, 7(4):77-91, Nov. 14, 2003.

Lakshmanamurthy, S., et al., "Network Processor Performance Analysis Methodology", *Intel Technology Journal*, 6(3):19-28, Aug. 15, 2002.

Vipat, H., et al., "Network Processor Building Blocks for All-IP Wireless Network", *Intel Technology Journal*, 6(3):61-69, Aug. 15, 2002.

* cited by examiner

METHOD FOR OPTIMIZING QUEUING PERFORMANCE

BACKGROUND

Store and forward network devices such as routers and switches are expected to process data packets at high line speeds of, e.g., 10 Gigabits and higher. In general, the network device should be able to store newly received data packets to a memory structure at a rate at least equal to the arrival time of the packets. In addition, in order to maintain system throughput without dropping data packets, packets should be removed from the memory and transmitted at the packet arrival rate.

DETAILED DESCRIPTION

Figure 1:
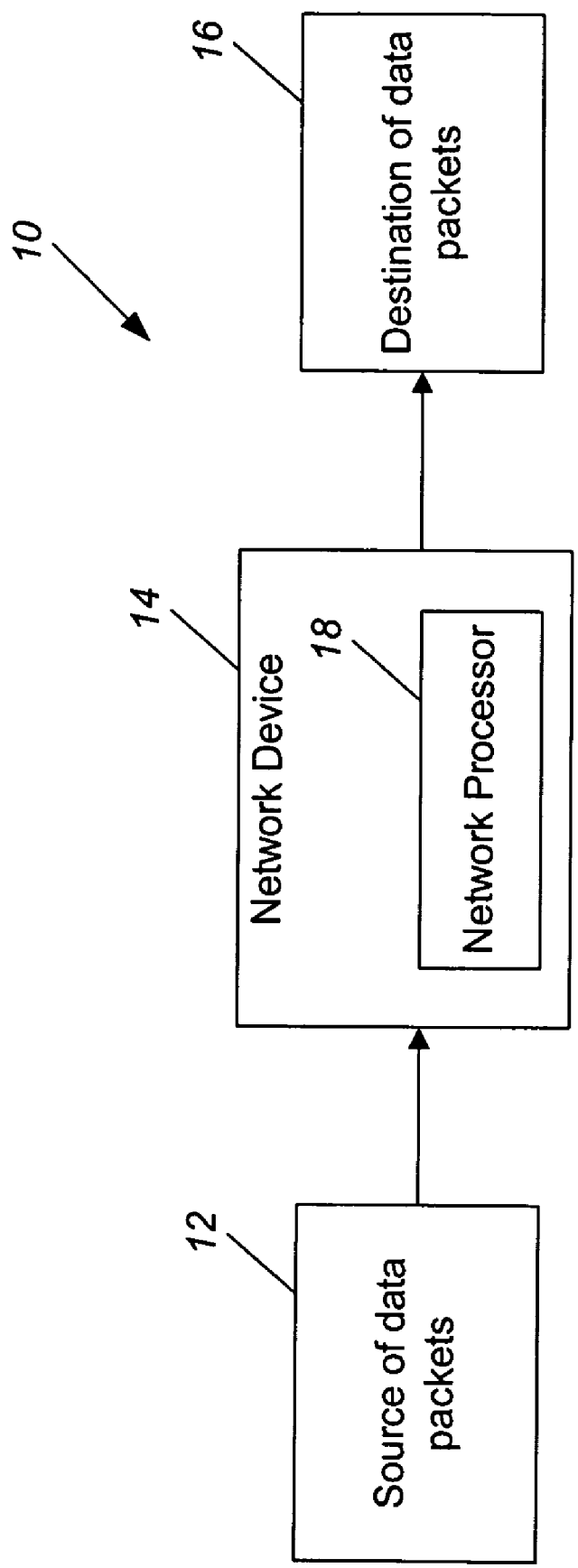
FIG. 1 is a block diagram of a network system.

Referring to FIG. 1, a network system 10 for processing data packets includes a source 12 of data packets coupled to an input of a network device 14. An output of the network device 14 is coupled to a destination 16 of data packets. The network device 14 can include a network processor 18 having a memory for operating on memory data structures. The processor executes instructions and operates with the memory data structures as configured to store and forward the data packets to a specified destination. Network device 14 can include or be part of, for example, a network switch or a network router or a device coupled to the network via a network interface. The source of data packets 12 can include other network devices connected over a communications path operating at high data packet transfer line speeds, such as, an optical carrier 10 gigabit line (i.e., OC-192) or other line speeds. The destination 16 of data packets can be a network switch or a network router or a device coupled to the network via a network interface.

Figure 2:
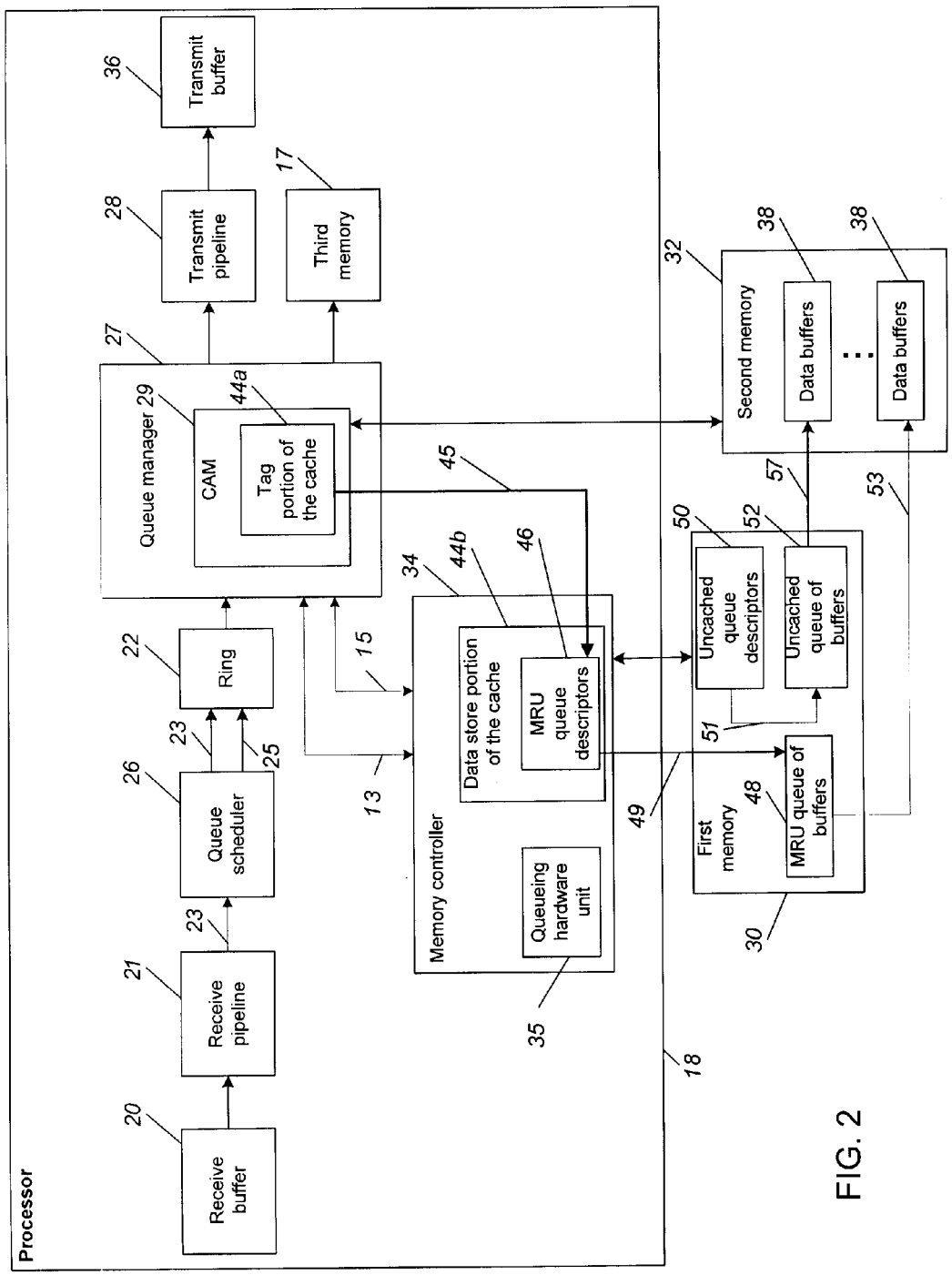
FIG. 2 is a block diagram of a network processor.

Referring to FIG. 2, the network processor 18 has multiple programming engines. In one arrangement the multiple programming engines function, respectively, as a receive pipeline 21, a queue scheduler 26, a queue manager 27 and a transmit pipeline 28. Processor 18 includes a queue manager 27 that includes a multiple-entry content addressable memory (CAM) 29 that stores a tag portion 44a of a cache entry, e.g., N of the most recently used (MRU) queue descriptors where N is the number of entries in the CAM 29. The other programming engines may also include a multiple-entry content addressable memory (CAM) not shown.

The network processor 18 also includes a memory controller 34 that is coupled to a first memory 30 and second memory 32. The processor also includes a third memory 17 that stores instructions for causing the engines to operate as discussed in detail below. Although the present implementation uses separate memories, a single memory may be used to perform the functions of the first and second memories mentioned above. The memory controller 34 has a queuing hardware unit 35 that is capable of handling enqueue and dequeue operations in parallel across multiple queues (described in more detail below). The queuing hardware unit 35 can be implemented with one or more internal first-in-first-out (FIFO) data structures that store queue requests received from the queue manager 27. The memory controller 34 initiates queue commands in the order in which the queue requests are received and exchanges data with the queue manager 27. The first memory 30 has a memory space for storing data as described below. The second memory 32 is coupled to the queue manager 27 and other components of the network processor 18.

The first memory 30 and the second memory 32 reside externally to the network processor 18. Alternatively, the first memory 30 and/or the second memory 32 can be internal to the network processor 18. The processor 18 also includes hardware interfaces to a receive bus and a transmit bus that are coupled to receive and transmit buffers 20, 36.

A receive buffer 20 is configured to buffer data packets received from the source 12 of data packets. Each data packet includes a payload portion representing the actual data sent to the destination, and a header portion including a source data portion representing the network address of the source of the data, and a destination data portion representing the network address of one or more destinations of the data.

The receive pipeline 21 is coupled to the output of the receive buffer 20 and is configured to process data packets from the receive buffer 20 and store the data packets in data buffers 38 in the second memory 32. The receive pipeline 21 includes multiple multi-threaded programming engines working in a pipelined manner. The engines receive packets, classify the packets, and store the packets in an output queue based on the classification. This receive processing determines an output queue to which each packet is enqueued to. Using a pipelining arrangement permits the programming engine to process a packet in a first stage of execution and, when processing of the packet is complete at the first stage, cause the packet to be sent to a succeeding stage, while the first stage starts processing of a new packet. Thus the processor does not lie idle while waiting for the first stage to be completed. Pipelining can lead to enhanced system performance.

Once the data packets are processed by the receive pipeline 21, the receive pipeline 21 generates enqueue requests 23 and sends the enqueue requests 23 to a queue scheduler 26. An enqueue request 23 represents a request to append a packet descriptor that describes a newly received packet to the last packet descriptor in a most recently used (MRU) queue of buffers 48 in the first memory 30.

The queue scheduler 26 determines the order of packets to be transmitted. The queue scheduler 26 generally passes received enqueue requests 23 from the receive pipeline 21 to the queue manager 26 along with any dequeue requests 25 that the queue scheduler has generated based on specified criteria (e.g., when the number of packets in a particular queue of packets reaches a predetermined level). A dequeue request 25 represents a request to remove the first packet from the MRU queue of buffers 48. The queue scheduler 26 also includes scheduling algorithms for generating dequeue requests 25 such as "round robin", priority-based or other scheduling algorithms. The queue scheduler 26 maintains a count of packets so that the queue scheduler 26 knows to not schedule empty queues.

The queue scheduler 26 passes the requests 23, 25 to the queue manager 27 using a ring 22 having a next-neighbor data structure of M slots, where M is an integer greater than one. The queue manager 27 includes software components configured to manage the queuing hardware unit 35 in the memory controller 34. The queuing hardware unit 35 handles several enqueue requests 23 and dequeue requests 25 in parallel. That is, the queuing hardware unit 35 can parallelize the enqueue/dequeue operations within the same queue, as well as, across multiple queues and achieve a high line speed of e.g., 10 Gigabits or higher, if each queue has 2 or more entries.

However, at such high line speeds, a common bottleneck occurs at a queuing sub-system, such as the queuing hardware unit 35, when all of the packets are destined for the same queue. Consecutive enqueue operations to the same queue are latency constrained since the first enqueue provides the link to a list tail pointer before a subsequent entry can be linked on to that new tail. Likewise, for consecutive dequeue operations, the head pointer of the queue is read to determine the new head pointer for the list before a subsequent dequeue operation is done. If the queue to which all of the packets are destined has 0 or 1 entries, the enqueue and dequeue operations are further latency constrained as the enqueue and dequeue operations have to be serialized with respect to each other as the head and tail pointers of the queue are identical. This has the effect of causing the queuing hardware unit 35 in the memory controller 34 to fall behind in terms of performing the enqueue and dequeue operations at line rate as the queuing hardware unit 35 is unable to parallelize the operations within the same queue.

When the queuing hardware unit 35 falls behind, the FIFO data structures that store queue requests 23, 25 received from the queue manager 27, start to fill up. Once the FIFO data structures in the queuing hardware unit 35 are full, no new enqueue requests 23 or dequeue requests 25 are sent from the queue manager 27. This in turn causes the ring 22 between the queue scheduler 26 and the queue manager 27 to "back up". Depending on the rate at which the queuing hardware unit 35 is able to process the queue requests 23, 25, the ring 22 may become full.

The queue scheduler 26 is configured to monitor the state of the ring 22. When the total number of queue requests 23, 25 present on the ring 22 is equal to M (i.e., when the ring 22 is full), the queue scheduler 26 waits until a slot in the ring 22 becomes available, and allows only an enqueue request 23 to be placed on the ring 22 and directed to the queue manager 27. This action by the queue scheduler 26 can cause the queue build up to be greater than or equal to two. When this happens, the queuing hardware unit 35 is able to parallelize the enqueue/dequeue operations within the queue, which helps to reduce the build up in the FIFO data structures in the queuing hardware unit 35, as well as, the build up in the ring 22. From this point, the queue scheduler 26 allows both an enqueue request 23 and a dequeue request 25 to be placed on the ring 22 per subsequent available slot as the queuing hardware unit 35 can exploit the parallelism of these operations and achieve full line rate performance.

The queue manager 27 also manages a cache of data structures that describe the queues ("queue descriptors"). The cache has a tag portion 44a and a data store portion 44b. The tag portion 44a of the cache resides in the queue manager 27, and the data store portion 44b of the cache resides in the memory controller 34. The tag portion 44a of the cache is managed by the CAM 29, which can include hardware components configured to implement a cache entry replacement policy such as a least recently used (LRU) policy. The tag portion of each entry in the cache references one of the last N queue descriptors used to enqueue and dequeue packets by storing as a CAM entry that queue descriptor's location in memory, where N is the number of entries in the CAM. The corresponding queue descriptor is stored in the data store portion 44b of the memory controller 34 at the address entered in the CAM. The actual data placed on the queue is stored in the second memory 32.

The data store portion 44b of the cache maintains a certain number of the most recently used (MRU) queue descriptors 46. Each MRU queue descriptor 46 includes pointers 49 to a corresponding MRU queue of buffers 48 in the first memory 30. In one implementation, the number of MRU queue descriptors 46 in the data store portion 44b of the cache is sixteen. Each MRU queue descriptor 46 is referenced by a set of pointers 45 residing in the tag portion 44a of the cache. In addition, each MRU queue descriptor 46 is associated with a unique identifier so that it can be identified easily. The MRU queue of buffers 48 include pointers 53 to the data buffers 38 residing in the second memory 32 and the data buffers 38 may store data packets that have been processed by the receive buffer 20.

Any uncached queue descriptors 50 reside in the first memory 30 and are not currently referenced by the data store portion 44b of the cache. Each uncached queue descriptor 50 is associated with a unique identifier. The uncached queue descriptor 50 includes pointers 51 to a corresponding uncached queue of buffers 52. In turn, each uncached queue 52 includes pointers 57 to data buffers 38 residing in the second memory 32.

The enqueue request includes an address pointing to the data buffer 38 associated with the corresponding data packets. In addition, the enqueue or dequeue request includes an identifier specifying either an uncached queue descriptor 50 or a MRU queue descriptor 46 associated with the data buffer 38.

In response to receiving an enqueue request, the queue manager 27 generates an enqueue command 13 directed to the memory controller 34. The enqueue command 13 includes information specifying a MRU queue descriptor 46 residing in the data store portion 44b of the cache. In that case using the pointer 49, the MRU queue of buffers 48 is updated to point to the data buffer 38 including the received data packet. In addition, the MRU queue descriptor 46 is updated to reflect the state of the MRU queue of buffers 48. The MRU queue descriptor 46 is updated quickly and efficiently because the queue descriptor is already in the data store portion 44b of the cache.

If the enqueue command 13 includes a queue identifier specifying a queue descriptor that is not a MRU queue descriptor 46, the queue manager 27 replaces a particular MRU queue descriptor 46 with an uncached queue descriptor 50. As a result, the uncached queue descriptor 50 and the corresponding uncached queue of buffers 52 are referenced by the data store portion 44b of the cache. In addition, the newly referenced uncached queue 52 associated with the uncached queue descriptor 50 is updated to point to the data buffer 38 storing the received data packet.

In response to receiving a dequeue request 25, the queue manager 27 generates a dequeue command 15 directed to the memory controller 34. As with the enqueue commands 13 discussed above, the dequeue command 15 includes information specifying a queue descriptor. If a MRU queue descriptor 46 is specified, then data buffers 38 pointed to by a corresponding pointer 53 are returned to the queue manager 27 for further processing. The queue 48 is updated and no longer points to the returned data buffer 38 because it is no longer referenced by the data store portion 44b of the cache.

The dequeue command 15 may include a queue descriptor that is not a MRU queue descriptor 46. In that case, the queue manager 27 replaces a particular MRU queue descriptor 46 with the uncached queue descriptor 50. The replaced queue descriptor is written back to the first memory 30. As a result, the replacement MRU queue descriptor 46 and the corresponding MRU queue of buffers 48 are referenced by the data store portion 44b of the cache. The data buffer 38 pointed to by the MRU queue of buffers 48 is returned to the queue manager 27 for further processing. The MRU queue of buffers 48 is updated and no longer points to the data buffer 38 because it is no longer referenced by the data store portion 44b of the cache.

Figure 3:
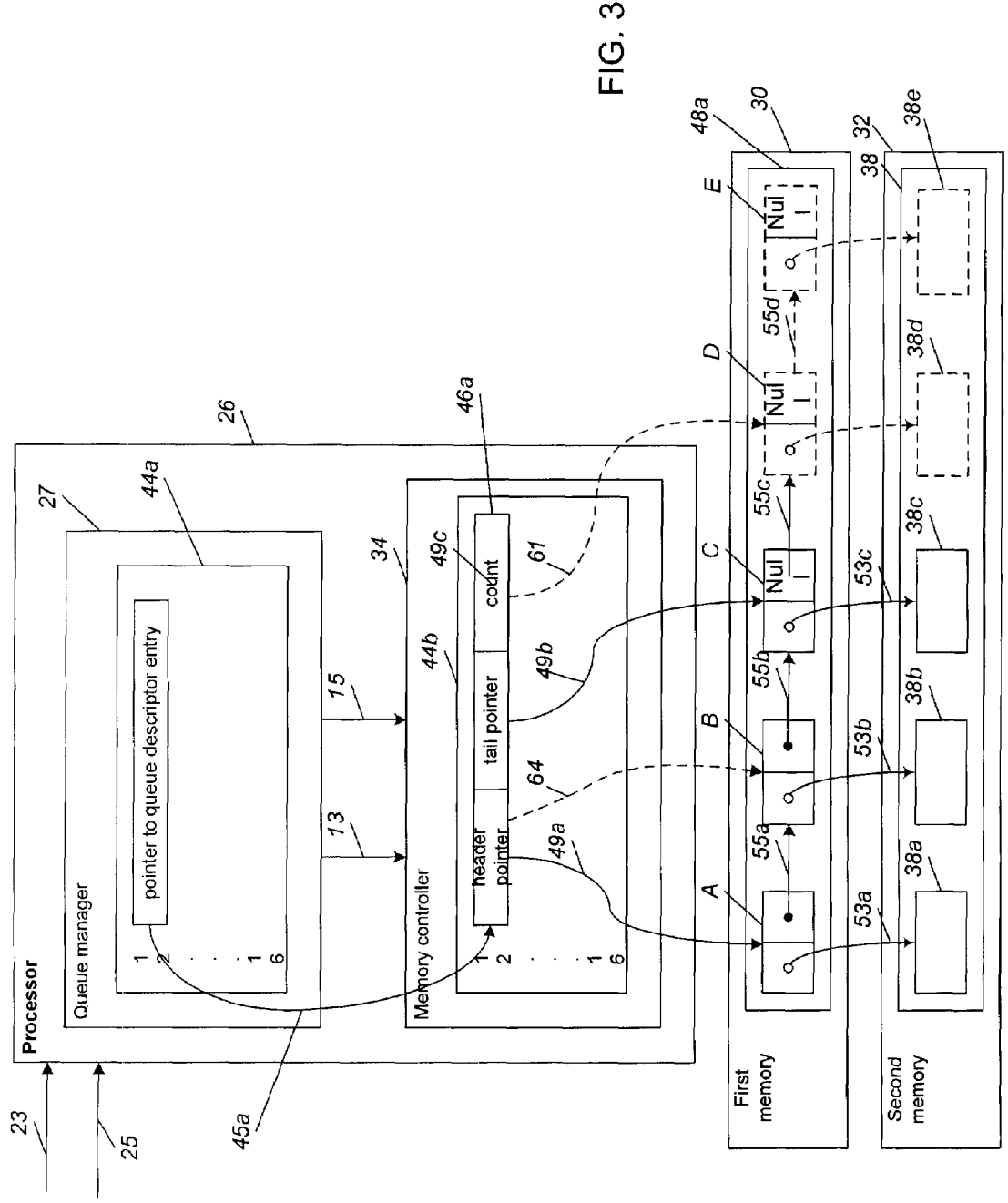
FIG. 3 is a block diagram of a cache data structure for use with enqueue and dequeue operations.

Referring to FIG. 3, an example of the operation of the cache is shown. In this example, the tag portion 44a of the cache includes sixteen entries. Other sizes of the tag portion are possible. For purposes of illustration only, the following discussion focuses on the first entry in the tag portion 44a of the cache. The first entry is associated with a pointer 45a that points to a MRU queue descriptor 46a residing in the data store portion 44b of the cache. The queue descriptor 46a is associated with a MRU queue of buffers 48a. The queue descriptor 46a includes a head pointer 49a pointing to the first buffer A and a tail pointer 49b pointing to the last buffer C. An optional count field 49c maintains the number of buffers in the MRU queue of buffers 48a. In this case the count field 49c is set to the value "3" representing the buffers A, B and C. As discussed in further detail below, the head pointer 49a, the tail pointer 49b and the count field 49c may be modified in response to enqueue requests and dequeue requests.

Each buffer in the MRU queue of buffers 48a, such as a first buffer A, includes a pointer 53a to a data buffer 38a in the second memory 32. Additionally, a buffer pointer 55a points to a next ordered buffer B. The buffer pointer 55c associated with the last buffer C has a value set to NULL to indicate that it is the last buffer in the MRU queue of buffers 48a.

In response to the receiving an enqueue request 23, the queue manager 27 generates an enqueue command 13 directed to the memory controller 34. The enqueue request 23 is associated with a subsequent data buffer 38d received after data buffer 38c. The enqueue request 23 includes information specifying the queue descriptor 46a and an address associated with the data buffer 38d residing in the second memory 32. The tail pointer 49b currently pointing to buffer C in the MRU queue of buffers 48a is returned to the queue manager 27. The enqueue request 23 is evaluated to determine whether the queue descriptor associated with the enqueue request is currently in the data store portion 44b of the cache. If it is not, then a replacement operation is performed. The replacement operation is discussed further below.

The buffer pointer 55c associated with buffer C currently contains a NULL value indicating that it is the last buffer in the MRU queue of buffers 48a. The buffer pointer 55c is set to point to the subsequent buffer D. That is accomplished by setting the buffer pointer 55c to the address of the buffer D.

Once the buffer pointer 55c has been set, the tail pointer 49b is set to point to buffer D as indicated by dashed line 61. This also may be accomplished by setting the tail pointer to the address of the buffer D. Since buffer D is now the last buffer in the MRU queue of buffers 48a, the value of the buffer pointer 55d is set to the NULL value. Moreover, the value in the count field 49c is updated to "4" to reflect the number of buffers in the MRU queue of buffers 48a. As a result, the buffer D is added to the MRU queue of buffers 48a by using the queue descriptor 46a residing in the data store portion 44b of the cache.

In some situations, none of the queue descriptors 46a currently occupying the data store portion 44b of the cache is associated with the newly arrived data buffer 38e. In that case, the processor performs a replacement operation by removing a particular queue descriptor from the data store portion 44b of the cache according to a replacement policy. The replacement policy can be, a LRU (Least Recently Used) policy in which a queue descriptor that has not been accessed during a predetermined time period is removed from the data store portion 44b of the cache. Other policies can also be used. The removed queue descriptor is written back to the first memory 30. As discussed above, the removed queue descriptor is replaced with the queue descriptor associated with data buffer 38e. Once the replacement operation is completed, queue operations associated with the enqueue request are performed as previously discussed above.

In response to receiving a dequeue request, the queue manager 27 generates a dequeue 15 command directed to the memory controller 34. In this example, the dequeue request is associated with the queue descriptor 46a and represents a request to retrieve the data buffer 38a from the second memory 32. Once the data buffer 38a is retrieved, the data buffer 38a is transmuted from the second memory 32 to the transmit buffer 36. The dequeue request 25 includes information specifying the queue descriptor 46a. The head pointer 49a of the queue descriptor 46a points to the first buffer A which in turn points to data buffer 38a. As a result, the data buffer 38a is returned to the queue manager 27.

The head pointer 49a is set to point to the next buffer B in the MRU queue of buffers 48a, as indicated by the dashed line 64, by setting the head pointer 49a to the address of buffer B. The value in the count field 49c is updated to "4", reflecting the remaining number of buffers (B through B). As a result, the data buffer 38a is retrieved from the MRU queue of buffers 48a by using the queue descriptor 46a residing in the data store portion 44b of the cache.

In some situations, the queue descriptor 46a currently occupying an entry of the data store portion 44b of the cache is not associated with the data buffer 38b. In that case, the processor performs a replacement operation similar to the one discussed above. Once the replacement operation has been completed, operations associated with the dequeue request are performed as previously discussed above.

The cache of queue descriptors can be implemented in a distributed manner such that the tag portion 44a resides in the memory controller 34 and the data store portion 44b resides in the first memory 30. Data buffers 38 that are received from the receive buffer 20 can be processed quickly. For example, the second of a pair of dequeue commands can be started once the head pointer for that queue descriptor is updated as a result of the first dequeue memory read of the head pointer. Similarly, the second of a pair of enqueue commands can be started once the tail pointer for that queue descriptor is updated as a result of the first enqueue memory read of the tail pointer. In addition, using a queue of buffers, such as a linked list of buffers, allows for a flexible approach to processing a large number of queues. Data buffers can be quickly enqueued to the queue of buffers and dequeued from the queue of buffers.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other embodiments are within the scope of the following claims.

What is claimed is:

1. A method comprising:

passing, from a ring having M slots, one or more enqueue requests and one or more dequeue requests to a queue manager;

monitoring the enqueue requests and the dequeue requests on the ring; and determining at a queue scheduler whether the ring is full, and when the ring is full, waiting until one of the M slots is next available then sending only an enqueue request to the queue manager, otherwise when the ring is not full, sending both an enqueue request and a dequeue request to the queue manager.

2. The method of claim 1 wherein each enqueue request designates a particular output queue to which an element is to be added.

3. The method of claim 2 wherein the element comprises data having one or more data packets.

4. The method of claim 1 wherein each dequeue request designates a particular output queue from which an element is to be removed.

5. The method of claim 4 wherein the element comprises data having one or more data packets.

6. The method of claim 1 wherein the ring includes two or more slots.

7. The method of claim 1, further comprising:
receiving on the ring enqueue requests from one or more processing engines.

8. The method of claim 1, further comprising:
receiving on the ring dequeue requests from a queue scheduler.

9. A computer program product, disposed in a computer readable medium, having instructions for causing a processor to:
pass, from a ring having M slots, one or more enqueue requests and one or more dequeue requests to a queue manager;
monitor the enqueue requests and the dequeue requests on the ring; and
determine, at a queue scheduler, whether the ring is full, and when the ring is full, wait until one of the M slots is next available then send only an enqueue request to the queue manager, otherwise when the ring is not full, send both an enqueue request and a dequeue request to the queue manager.

10. The computer program product of claim 9 wherein each enqueue request designates a particular output queue to which an element is to be added.

11. The computer program product of claim 10 wherein the element comprises data having one or more data packets.

12. The computer program product of claim 9 wherein each dequeue request designates a particular output queue from which an element is to be removed.

13. The computer program product of claim 12 wherein the element comprises data having one or more data packets.

14. The computer program product of claim 9 wherein the ring includes two or more slots.

15. The computer program product of claim 9, further comprising instructions operable to cause the processor to:
receive on the ring enqueue requests from one or more processing engines.

16. The computer program product of claim 9, further comprising instructions operable to cause the processor to:
receive on the ring dequeue requests from a queue scheduler.

17. An apparatus comprising:
a processing engine to make enqueue requests;
a queue scheduler to make dequeue requests;
a queue manager configured to process the enqueue requests and the dequeue requests;
a ring having M slots, the ring configured to pass the enqueue requests from the processing engine to the queue manager and to pass the dequeue requests from the queue scheduler to the queue manager; and
a queue scheduler configured to monitor the enqueue requests and dequeue requests on the ring and determine whether the ring is full, and when the ring is full wait until one of the M slots is next available then send only an enqueue request to the queue manager, otherwise when the ring is not full, send both an enqueue request and a dequeue request to the queue manager.

18. The apparatus of claim 17 wherein each enqueue request designates a particular output queue to which an element is to be added.

19. The apparatus of claim 18 wherein the element comprises data having one or more data packets.

20. The apparatus of claim 17 wherein each dequeue request designates a particular output queue from which an element is to be removed.

21. The apparatus of claim 20 wherein the element comprises data having one or more data packets.

22. The apparatus of claim 17 wherein the ring includes two or more slots.

23. A system comprising:
a source of data packets;
a destination of data packets; and
a device operating to transfer packets from the source to the destination comprising:
a processing engine to make enqueue requests;
a queue scheduler to make dequeue requests;
a queue manager configured to process the enqueue requests and the dequeue requests; and
a ring having M slots and configured to pass the enqueue requests from the processing engine to the queue manager and to pass the dequeue requests from the queue scheduler to the queue manager;
wherein the queue scheduler is configured to monitor the enqueue requests and dequeue requests on the ring and determine whether the ring is full, and when the ring is full wait until one of the M slots is next available then send only an enqueue request to the queue manager, otherwise when the ring is not full, send both an enqueue request and a dequeue request to the queue manager.

24. The system of claim 23, wherein each enqueue request designates a particular output queue to which an element is to be added.

25. The system of claim 24 wherein the element comprises one or more data packets.

26. The system of claim 23 wherein each dequeue request designates a particular output queue from which an element is to be removed.

27. The system of claim 26 wherein the element comprises one or more data packets.

28. A network device comprising:
an input port for receiving a data packet;
an output port for transmitting a data packet; and
a scheduling device configured to,
pass, on a ring having M slots, one or more enqueue requests and one or more dequeue requests to a queue manager;
monitor the enqueue requests and the dequeue requests on the ring; and
determine whether the ring is full, and when the ring is full, waiting until one of the M slots is next available then sending only an enqueue request to the queue manager, otherwise when the ring is not full, sending both an enqueue request and a dequeue request to the queue manager.

29. The network device of claim 28, wherein the scheduling device is further capable of generating one or more dequeue requests.

* * * * *